(12) United States Patent
Buehler et al.

(10) Patent No.: US 11,120,157 B2
(45) Date of Patent: Sep. 14, 2021

(54) SYSTEM AND METHOD FOR SAFE USAGE AND FAIR TRACKING OF USER PROFILE DATA

(71) Applicant: International Business Machines Corporation, Armonk, NY (US)

(72) Inventors: Dieter Buehler, Tueblingen (DE); Daniel Kaulen, Boeblingen (DE); Nedim Karaoguz, Stuttgart (DE); Sven Stüven, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/372,779

(22) Filed: Apr. 2, 2019

(65) Prior Publication Data

US 2020/0320218 A1 Oct. 8, 2020

(51) Int. Cl.
*G06F 21/00* (2013.01)
*G06F 21/62* (2013.01)
*H04L 12/24* (2006.01)
*H04L 29/08* (2006.01)
*H04L 29/06* (2006.01)

(52) U.S. Cl.
CPC .......... *G06F 21/6245* (2013.01); *H04L 41/28* (2013.01); *H04L 63/101* (2013.01); *H04L 67/306* (2013.01)

(58) Field of Classification Search
CPC .......... G06F 21/32; G06F 21/31; G06F 21/54; G06F 21/552; G06F 21/554; G06F 21/564; G06F 21/6245; H04L 41/28; H04L 63/101; H04L 67/306
See application file for complete search history.

(56) References Cited

U.S. PATENT DOCUMENTS

| | | | |
|---|---|---|---|
| 9,158,733 B2 * | 10/2015 | Capel | G06F 15/173 |
| 9,658,739 B1 * | 5/2017 | Freund | G06F 3/04817 |
| 9,769,124 B2 * | 9/2017 | Yan | G06F 21/62 |
| 10,027,714 B2 | 7/2018 | Rajagopal et al. | |

(Continued)

OTHER PUBLICATIONS

Xu et al., "Secure Fine-Grained Access Control and Data Sharing for Dynamic Groups in the Cloud," IEEE Transactions on Information Forensics and Security, vol. 13, No. 8, Aug. 2018, pp. 2101-2113.

(Continued)

*Primary Examiner* — Ghazal B Shehni
(74) *Attorney, Agent, or Firm* — Jamar K. Ray

(57) ABSTRACT

A method may include receiving, from a fair tracking client, a user profile containing user profile data. The method may also include receiving, from a service-provider web site, an access request to access the user profile. The method may also include determining to grant the access request. The method may also include permitting the service-provider website to access the user profile in response to the determination to grant the access request. The method may also include receiving a modify request from the service-provider website to add suggested user profile data to the user profile. The method may also include determining, in response to the modify request, to modify the user profile to include the suggested user profile data. The method may also include modifying the user profile in response to the determination to modify the user profile.

20 Claims, 8 Drawing Sheets

(56) References Cited

U.S. PATENT DOCUMENTS

| | | | | |
|---|---|---|---|---|
| 10,474,741 | B1* | 11/2019 | Garg | G06F 16/958 |
| 2005/0136946 | A1* | 6/2005 | Trossen | H04W 4/029 |
| | | | | 455/456.2 |
| 2011/0320741 | A1 | 12/2011 | Tian et al. | |
| 2014/0006129 | A1* | 1/2014 | Heath | G06Q 30/0222 |
| | | | | 705/14.23 |
| 2014/0006512 | A1 | 1/2014 | Huang et al. | |
| 2014/0119531 | A1* | 5/2014 | Tuchman | H04M 3/5166 |
| | | | | 379/265.09 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

SYSTEM AND METHOD FOR SAFE USAGE AND FAIR TRACKING OF USER PROFILE DATA

BACKGROUND

The present disclosure relates to data privacy, and more specifically, to management of user data.

Security and privacy concerns may arise when a user shares personal data online. Such concerns may be mitigated with the use of personal data management tools.

SUMMARY

Some embodiments of the present disclosure can be illustrated as a method including receiving a user profile. The user profile may contain user profile data. The user profile may be received from a fair tracking client. The method may also include receiving an access request to access the user profile. The request may be received from a service-provider website. The method may also include determining to grant the access request. The method may also include permitting the service-provider website to access the user profile. The permitting may be in response to the determination to grant the access request. The method may also include receiving a modify request from the service-provider website. The modify request may be to add suggested user profile data to the user profile. The method may also include determining to modify the user profile to include the suggested user profile data. The determining may be in response to the modify request. The method may also include modifying the user profile in response to the determination to modify the user profile. The modifying may result in a modified user profile.

Some embodiments of the present disclosure can be illustrated as a system. The system may include a processor. The system may also include a memory in communication with the processor. The memory may contain program instructions. The program instructions may be executed by the processor. When executed by the processor, the program instructions may be configured to cause the processor to perform a method. The method may comprise receiving a user profile. The user profile may contain user profile data. The user profile may be received from a fair tracking client. The method may also include receiving an access request. The access request may be to access the user profile. The access request may be received from a service-provider website. The method may also include determining to grant the access request. The method may also include permitting the service-provider website to access the user profile. The accessing the user profile may be in response to the determination to grant the access request. The method may also include receiving a modify request. The modify request may be from the service-provider website. The modify request may be to add suggested user profile data to the user profile. The method may also include determining to modify the user profile. The determining may be in response to the modify request. The modifying the user profile may be to include the suggested user profile data. The method may also include modifying the user profile. The modifying may be in response to the determination to modify the user profile. The modifying may result in a modified user profile.

Some embodiments of the present disclosure can be illustrated as a computer program product. The computer program product may comprise a computer readable storage medium. The computer readable storage medium may have program instructions embodied therewith. The program instructions may be executable by a computer. The program instructions may cause the computer to receive a user profile. The user profile may contain user profile data. The user profile may be from a fair tracking client. The program instructions may further cause the computer to receive an access request to access the user profile. The access request may be from a service-provider website. The program instructions may further cause the computer to make a determination to grant the access request. The program instructions may further cause the computer to permit the service-provider website to access the user profile. The permitting may be in response to the determination to grant the access request. The program instructions may further cause the computer to receive a modify request. The modify request may be from the service-provider website. The modify request may be to add suggested user profile data to the user profile. The program instructions may further cause the computer to make a determination to modify the user profile. The modifying of the user profile may be to include the suggested user profile data. The making a determination may be in response to the modify request. The program instructions may further cause the computer to modify the user profile. The modifying of the user profile may be in response to the determination to modify the user profile. The modifying of the user profile may result in a modified user profile.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
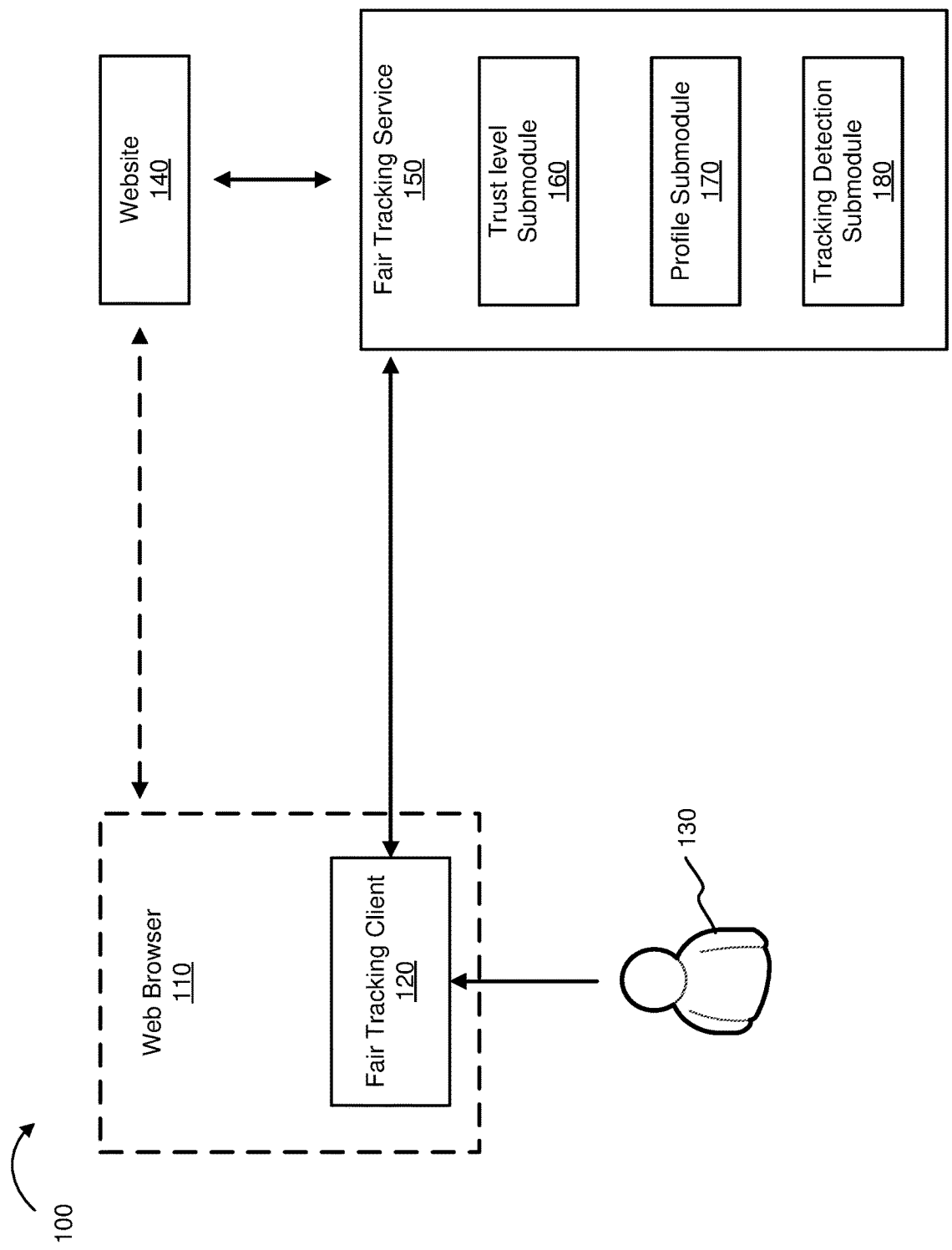
FIG. 1 depicts an example fair tracking system and the communication between components of the fair tracking system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data privacy; more particular aspects relate to online management of personal user data. While the present disclosure is not necessarily limited to such applications, various aspects of the disclosure may be appreciated through a discussion of various examples using this context.

Online service providers and internet advertising companies may utilize a variety of tools to collect information about internet users' online activities. By visiting a website, an internet user may be providing personal data such as their name, geographic location, home address, and data about previous online searches and/or purchases. This personal data may be used by the visited website and shared among companies and/or other parties.

Internet users may be interested in limiting the collection, aggregation, and sharing of their personal data as they use the internet. Additionally, internet users may be interested in limiting what personal data is made available when they use the internet.

To address these and other issues, embodiments of the present disclosure include a method and system that may provide internet users with improved control over their personal data when they use the internet.

Embodiments of the present disclosure may include a fair tracking service that manages access to a user's personal data when the user engages in web-based activity. The fair tracking service may manage such access by receiving a user profile containing a user's personal data and controlling access to the user profile based on a trust level associated with a visited website. The fair tracking service may allow access to at least a portion of the user profile by a website whose trust level exceeds a threshold value. Additionally, the fair tracking service may grant requests by the website to modify the user profile in accordance with user rule settings, manual user approval, or a comparison of a website's trust level to a threshold value.

A service provider may be an entity (e.g. a private company, government agency, organization, etc.) that provides a service-provider website ("website") by which a user may engage in web-based activities (e.g. performing searches, purchasing products, participating in social networking, banking, etc.). A fair tracking service may assist a user by managing the user's personal data as the user engages in web-based activities on such a website.

For example, the fair tracking service may include a secure interface by which a user may create a user profile that includes personal profile data (e.g., phone number, address, credit card or other payment information, etc.). The user profile may also include user preferences (e.g., a list of categories of products to search for, preferred product brands, news topics of interest, etc.).

In some embodiments, the fair tracking service may receive an access request from a website to obtain user profile data, and in response, the fair tracking service may grant the access request if the website meets one or more preestablished requirements. For example, in some embodiments, the fair tracking service may assign a trust level to a website; the trust level may be a numerical value that represents a likelihood that the website handles user data in a manner that is consistent with the user's preferences. In such embodiments, the fair tracking service may grant the website's access request if the website's trust level exceeds a threshold value. In some embodiments, the fair tracking service may grant a website's access request according to a user-defined rule, such as a rule that specifies that only the websites of nonprofit organizations may access a user profile. In some embodiments, the fair tracking service may grant a website's access request only if the user has been presented with the access request and has manually accepted the access request.

In some embodiments, the fair tracking service may generate a unique, temporary tracking identification code ("tracking ID") to be associated with the user's activity on a website. The tracking ID may be used in place of a user name so that the user may maintain a degree of anonymity when using a website.

In some embodiments, the fair tracking service may receive a modify request from a website that has been granted access to a user profile. The modify request may be a request to add or remove data from the user profile. For example, a website may recognize one or more trends in a user's activity on the website, and in response, the website may provide suggested user profile data to be added to the user profile to better tailor the website to the user's needs. For example, a website for a shoe store may recognize that a user regularly searches for boots on the website; in response, the website may suggest that "boots" be added to a "shoe preferences" category within the user profile. In contrast, using the same example, the website may recognize that the user's profile only includes "sandals" in the "shoe preferences" category, and in response, the website may suggest that "sandals" be removed from the user profile because the user has not searched for sandals within a predetermined time period, such as a time period of 6 months.

In some embodiments, in response to receiving a modify request, the fair tracking service may approve the modify request if the website meets one or more preestablished requirements. For example, in some embodiments, the fair tracking service may approve a modify request if the website's trust level exceeds a threshold value. In some embodiments, the fair tracking service may approve a modify request according to a user-defined rule. In some embodiments, the fair tracking service may require that the user be presented with the modify request to be manually approved.

In some embodiments, the fair tracking service may be configured to obtain tracking information about a website's tracking practices and modify the website's trust level accordingly. For example, if the fair tracking service determines that a website may be using other means to track the user's activity (e.g., third-party analytic software) and circumvent the fair tracking service, the fair tracking service may decrease the website's trust level.

The fair tracking service may provide, to a user, improved control over the sharing of the user's personal data while the user engages in web-based activity. Additionally, by providing user profile data that is input by a user and approved by the user for sharing with a website, the fair tracking service may provide to the website user data that may be more informative and more accurate than user data acquired by other means.

Turning to the figures, FIG. 1 illustrates an example embodiment of a fair tracking system 100. The system 100 includes a fair tracking service 150. The fair tracking service 150 may be a computer program or application implemented on a computing device having storage and a processor. The fair tracking service 150 may manage, for a user 130, a user profile containing user profile data, as well as access to the user profile by a website 140. The fair tracking client 120 may be an interface by which the user 130 may input user profile data that may be securely transferred and stored by the fair tracking service 150. The fair tracking client 120 may also be an interface by which the user 130 may input responses to requests from the website 140.

For example, the fair tracking client 120 may be a graphical-user interface ("GUI") of a computing device. The user 130 may create a user profile by inputting into the fair tracking client 120 of the computing device user profile data such as a user name, address, searching preferences, rules for determining a website trust level, and/or rules for determining website access to the user profile. Additionally, in some embodiments, the fair tracking client 120 may provide the user 130 an interface for manually accepting or rejecting requests from the website 140 that are issued to the user via the fair tracking service 150.

In some embodiments, the fair tracking client 120 may be a web browser 110 plug-in. In those embodiments, the fair tracking client 120 may be embedded into the web browser 110, such that the web browser 110 displays the website 140 to the user, while the fair tracking service 150 manages user profile data and responses entered by the user into the fair tracking client 120 that may be provided to the website 140. In some embodiments, the fair tracking client 120 may be a secure, discrete GUI, separate from web browser 110, for inputting user profile data and user responses that may be shared with the website 140 via the fair tracking service 150.

Fair tracking service 150 may include submodules for managing interactions between website 140 and fair tracking client 120. For example, fair tracking service may include a trust level submodule 160, a profile submodule 170, and a tracking detection submodule 180. In some embodiments, fair tracking service 150 may manage interactions between website 140 and fair tracking client 120 without the use of discrete submodules 160, 170, and 180.

In some embodiments, profile submodule 170 may manage the creating, storing, sharing, and updating of a user profile. Additionally, profile submodule 170 may generate a unique, temporary tracking ID to be associated with the user's activity on website 140.

For example, in some embodiments, profile submodule 170 may receive user profile data from fair tracking client 120. Such user profile data may include a user name of the user 130 and a list of products the user is interested in searching for online. The profile submodule 170 may store the user profile data in a database under a user profile and update the database if the user 130 changes the user profile data at a later time.

In some embodiments, the profile submodule 170 may randomly generate a unique, temporary tracking ID, such as "TMPID00947," to be associated with the user's activity on the website 140. The profile submodule 170 may also store a correlation between a user name and the temporary tracking ID. The profile submodule 170 may share the temporary tracking ID, and not the user name, with the website 140 so that the user name may not be associated with user profile data shared with the website or with the user's activity on the website. By using the temporary tracking ID, the user may use the website and customize the website by sharing user profile data with the website, but the user may also maintain a degree of anonymity by not providing the user name to the website. Furthermore, the profile submodule 170 may generate a unique, temporary tracking ID for each of the user's visits to a website. In this configuration, the fair tracking service 150 may limit the website's ability to aggregate data about the user over multiple visits to the website by the user.

For example, a user named Jane Smith may use the fair tracking client 120 to create a user profile having the user name "Jane.Smith." The user profile may include a list of products Jane would like to search for online, such as running shoes and activewear. Upon receiving Jane's profile from the fair tracking client 120, the profile submodule 170 may store the profile and generate a unique, temporary tracking ID, such as "ID753001." When Jane visits a website 140 to search for products, the profile submodule 170 may provide the website 140 Jane's temporary tracking ID as well as access to select information in Jane's user profile. The website may then customize its presentation based on Jane's profile data (e.g., the website may display running shoes and activewear that are on sale or have received high customer ratings), and the website may associate Jane's shopping activity on the website (e.g., products Jane has reviewed, placed in a shopping cart, purchased, etc.) with the temporary tracking ID. Furthermore, if Jane ends a session with the website 140 (e.g., closes a web browser displaying the website) and initiates a new session with the website 140 (e.g., revisits the website in a new web browser window) the profile submodule 170 may provide the website 140 a new, unique temporary tracking ID to be associated with Jane's profile and with Jane's shopping activity on the website. This may help to prevent the website 140 from associating Jane's shopping activity during a first visit with her shopping activity on subsequent visits.

In some embodiments, trust level submodule 160 may assign and/or monitor a trust level for a visited website 140. The trust level may be a value, such as a numerical value within a range of numerical values, that represents a likelihood that the website handles user data in a manner that is consistent with the user's preferences. In some embodiments, the trust level may indicate the degree to which a user approves of a website's ability to access and/or modify the user profile (e.g., a website with a higher trust level may be allowed access to more user profile data within a user profile than a website with a lower trust level).

For example, in some embodiments, the trust level submodule 160 may obtain information from a third party company or organization that indicates that a website 140 maintains strict confidentiality of user data and does not share user data with other entities. In these embodiments, the trust level submodule 160 may assign the website a value of 4 on a scale of 1 to 5, where a value of 1 indicates that the website is untrustworthy and a value of 5 indicates that the website is most trustworthy.

In some embodiments, the trust level submodule 160 may obtain tracking information from a source such as the tracking detection submodule 180 (discussed in more detail below) or a third-party provider of information on website tracking practices. The tracking information may indicate that a website 140 uses tracking technology to obtain personal data about the user 130 in a way that may circumvent the fair tracking service 150 (e.g., the website utilizes spyware to obtain personal user data that the website cannot obtain from the fair tracking service). In these embodiments, the trust level submodule 160 may respond to the obtained tracking information by reducing a previously assigned trust level from a value of 4 to a value of 1.

In some embodiments, a user 130 may obtain information about a website's handling of user data, such as a breaking news article describing a website's poor user-privacy safeguards, and in response, the user may command the trust level submodule 160 to assign the website a value, such as a value of 1.

In some embodiments, a website 140 may be required to register with the fair tracking service 150 and obtain a trust certificate to use the fair tracking service 150. In these embodiments, the trust certificate may correspond with a trust level value that meets or exceeds a threshold value required to access a user profile. For example, the trust level submodule 160 may assign a default trust level value of 3 to a website that obtains a trust certificate, where a minimum threshold value of 3 is required to access a user profile. Furthermore, the trust level submodule 160 may verify that the website 140 maintains a trust level that exceeds a threshold trust level required to keep the trust certificate.

In some embodiments, the tracking detection submodule 180 may use anti-tracking technology to monitor whether a website 140 may be attempting to obtain personal user data. For example, the tracking detection submodule 180 may identify the website's use of tracking tools such as malware, spyware, and/or cookies, to aggregate the user's personal data as the user engages in web-based activity across multiple websites. The tracking detection submodule 180 may then report tracking information corresponding to the identification of such tracking tools to the trust level submodule 160. In response, the trust level submodule may modify the website's trust level.

Figure 2:
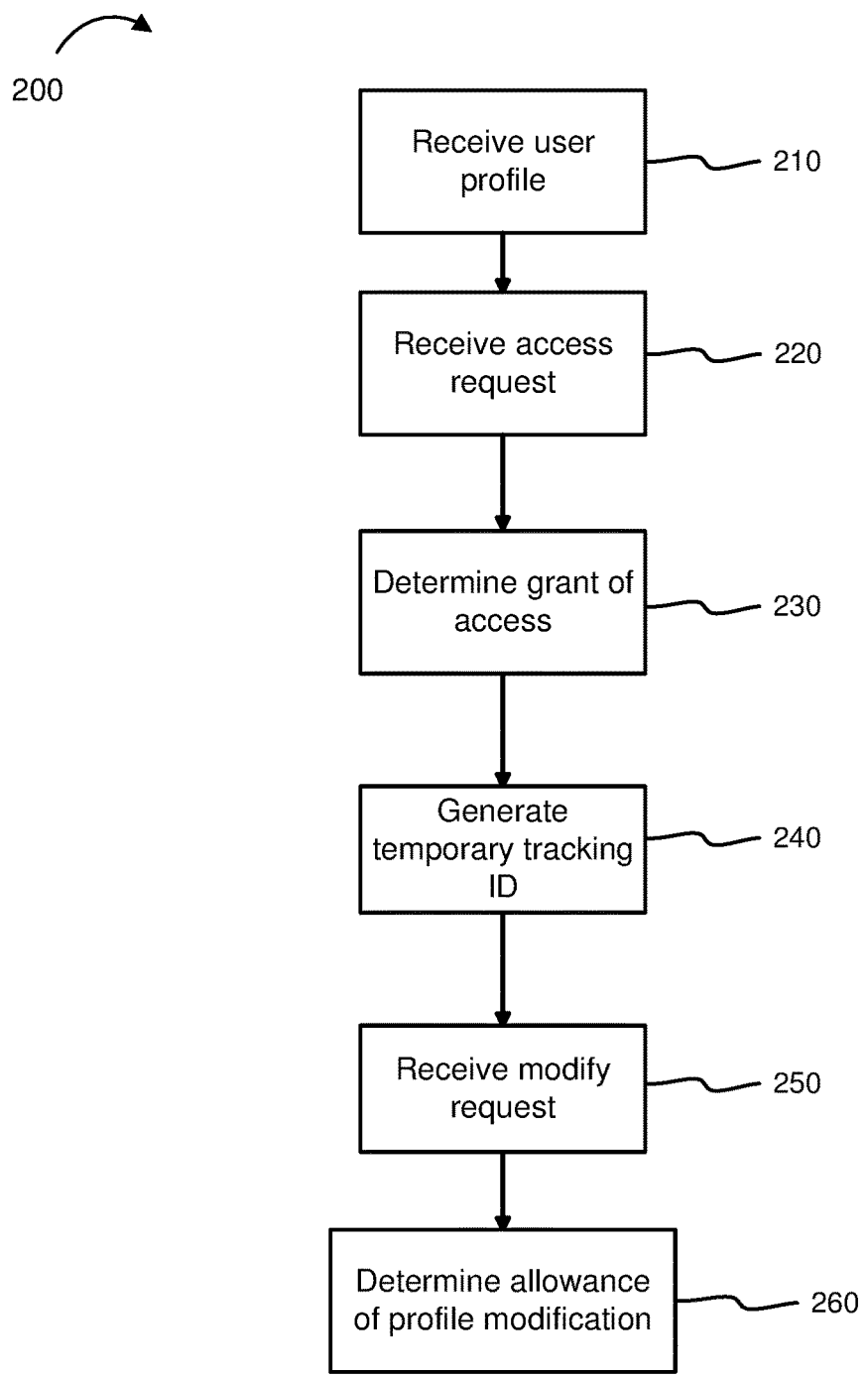
FIG. 2 depicts a flowchart of an example method of using a fair tracking system, in accordance with embodiments of the present disclosure.

FIG. 2 illustrates an embodiment of an example method 200 for using a system in accordance with the present disclosure. Method 200 may include a fair tracking service receiving a user profile in step 210. In some embodiments, the user profile may be received from a fair tracking client after a user has input user profile data into the fair tracking client. In some embodiments, step 210 may include receiving user profile data from a source such as a website, where the user may have an existing user profile, or from a file included on a storage device.

In some embodiments, the user profile may include personal user data (e.g. age, gender, address, credit card or other payment information, etc.), as well as user preferences (e.g. a list of categories of products to search for, preferred product brands, news topics of interest, etc.), and/or user rules. User rules may limit a website's access to a user profile; they may also restrict a website's ability to modify a user profile.

For example, a user may establish a rule that requires a website's trust level to exceed a user-specified threshold value before the website can access the user's profile. In some embodiments, a user may establish a rule that allows only specified websites to access portions of the user's profile regardless of the website's trust level value. For example, a user's rules may require a website's trust level value to exceed a value of 4.5 to gain access the user's profile, and the user's rules may also include that only one web site specified by the user may gain access to the user's credit card information within the user profile. In some embodiments, a user rule may allow a website to modify the user profile, and the rule may also set an expiration time and date for the modification. Such a rule may allow the user to tailor his or her profile for a non-regular web task but maintain a core user profile for his or her regular web activity. Also, in some embodiments, a user may establish a rule that no website may modify the user's profile.

In step 220, the fair tracking service may receive, from a website visited by a user, an access request to access a user profile. The access request may be a request from the website to obtain from the fair tracking service user profile data from the user profile. For example, when a user who has a user profile with the fair tracking service visits a website, the website may request user profile data from the user profile in order to customize the presentation of the website for the user. The website may submit the access request to the fair tracking service via a communication tool such as an Application Programming Interface ("API"). By gaining access to the user profile from the fair tracking service, the website may obtain accurate data about the user and the user's preferences, such that it may provide information best suited to the user's needs.

In step 230, the fair tracking service may determine whether to grant the website access to the user profile. The determination may be based on a trust level exceeding a predetermined threshold, a user rule, and/or a manual grant of access by the user. This determination is discussed in more detail in FIGS. 3A-3C.

In step 240, the fair tracking service may generate a temporary tracking ID. In some embodiments, the temporary tracking ID may be a randomly generated set of alphanumeric characters. In some embodiments, the fair tracking service may generate a unique temporary tracking ID for each visit by the user to the website. In some embodiments, the fair tracking service may include an expiration date and/or time for the temporary tracking ID, such that the temporary tracking ID may expire at a predetermined time.

In step 250, the fair tracking service may receive a modify request from the website. In some embodiments, the modify request may be an electronically submitted request, such as a request via an API, from the website to the fair tracking service to add or remove data from the user profile. The modify request may be based on the user's activity on the website.

For example, a user searching for information on various travel destinations on a website may have a user profile that includes "travel" as a category of interest. Based on the user's searching activity on the website, the website may recognize a trend, such as that the user frequently views information about beach destinations. Based on this trend, the website may submit a modify request to the fair tracking service to add suggested user profile data, such as a "beach travel" category to the user's profile. By modifying the user profile, the website may more accurately tailor its information for the user during the user's present use of the website and for the user's future visits to the website. Continuing with the example above, in response to an approved modification request to add the suggested user profile data, the website may tailor its presentation to include information specifically relevant to beach travel, such as travel advisories for popular beach destinations, discounted accommodations at beach destinations, or products that the user may be interested in purchasing for such a trip. The tailored presentation may improve the user's searching efficiency while using the website.

In step 260, the fair tracking service may determine whether to allow a modification to the user profile, which would result in a modified user profile. The determination may be based on a trust level exceeding a predetermined threshold, a user rule, and/or manual approval by the user. This determination is discussed in more detail in FIGS. 3A-3C.

The ability of the fair tracking service to allow such modifications to a user profile, coupled with the ability of the fair tracking service to provide a temporary tracking ID may provide unique long-term benefits. For example, over time, a website may modify a user profile such that the profile provides a highly accurate representation of the user's tastes and interests. However, because the website's development of such a user profile may occur through the use of an array of temporary tracking ID's, rather than the user's actual name or identification, the user may enjoy the benefits of sharing with the website detailed information about himself/ herself while maintaining some degree of privacy. Furthermore, the development of such a highly accurate user profile over time may occur through user profile modifications from an array of websites. Thus, in effect, the array of websites may "collaborate" to develop, for the user, a highly accurate user profile, which the user may then share with other websites at his or her discretion, while maintaining some degree of privacy.

Figure 3:
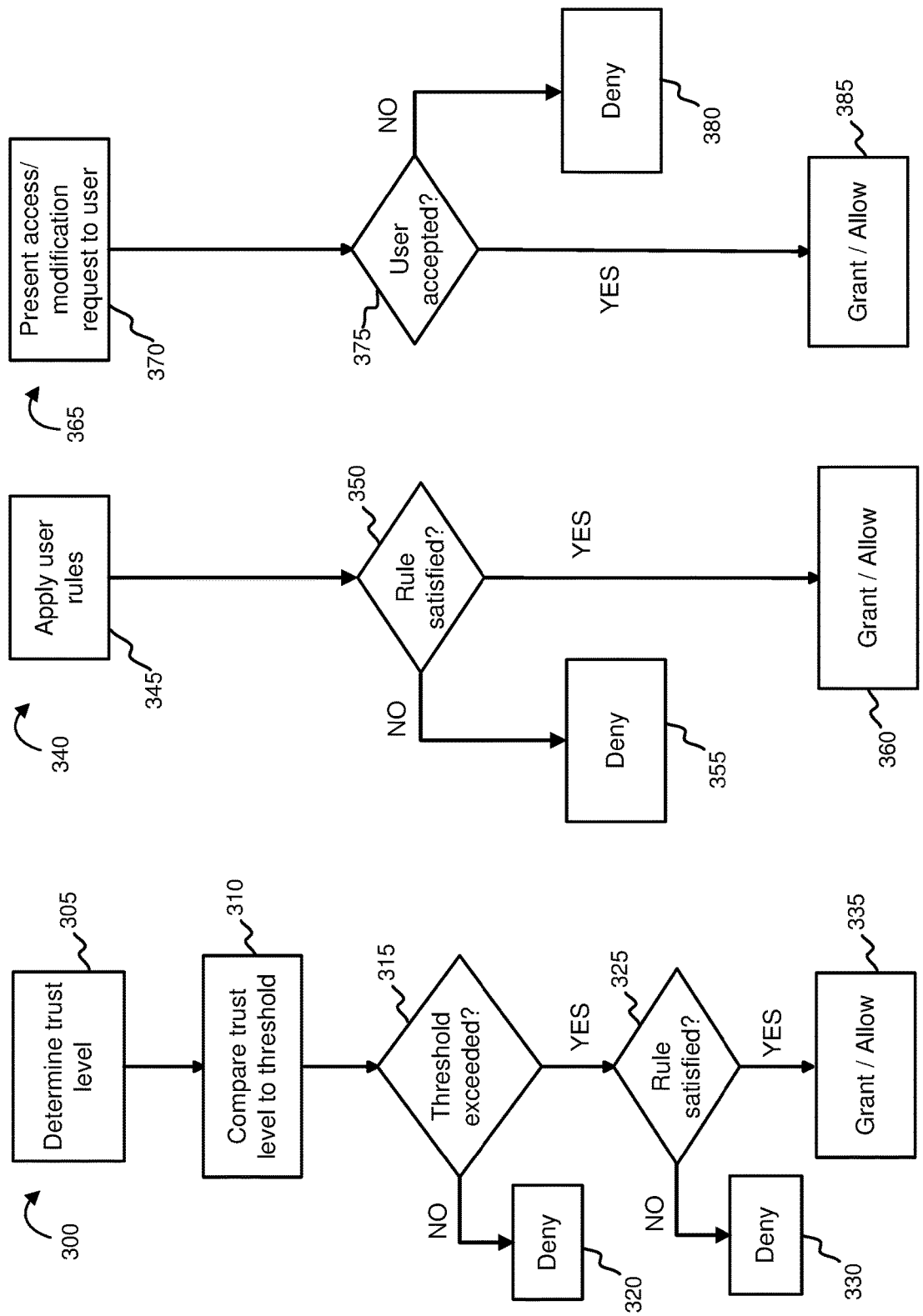
FIG. 3A depicts a flowchart of an example method for determining access to a user profile, in accordance with embodiments of the present disclosure.
FIG. 3B depicts a flowchart of an example method for determining access to a user profile or a profile modification, in accordance with embodiments of the present disclosure.
FIG. 3C depicts a flowchart of a further example method for determining access to a user profile or a profile modification, in accordance with embodiments of the present disclosure.

FIGS. 3A-3C illustrate example methods for determining a website's access to a user profile and for determining whether a website may modify a user profile, in accordance with embodiments of the present disclosure.

The method 300 illustrated in FIG. 3A may use a trust level of a website to determine the website's access to a user profile and the website's ability to modify the user profile. In step 305, the fair tracking service may determine a trust level of a website. For example, the fair tracking service may obtain a trust level rating, such as a 2-out-of-5-star rating, of the website from a third-party company and determine a corresponding trust level value, such as a 30% trust level value. The determined trust level value may be based on a set of preestablished correlations between third-party trust level ratings and trust level values used by the fair tracking service.

In step 310, the fair tracking service may compare the trust level value to one or more threshold values. For example, in some embodiments, the fair tracking service may require a website's trust level value to exceed a threshold value of 60% for the website to gain access to a user profile. In some embodiments, the fair tracking service may additionally require a website's trust level value to exceed a threshold value of 75% before the fair tracking service allows the website to modify a user profile. In contrast, in some embodiments the fair tracking service may require a website's trust level value to exceed a threshold value of 75% for the website to gain access to a user profile, but the fair tracking service may only require the website's trust level to exceed a threshold value of 60% for the website to modify the user profile. In some embodiments, the threshold values may be pre-established values included with the fair tracking service; in some embodiments, the threshold values may be selected by the user.

In step 315, the fair tracking service may determine whether the requisite threshold value has been exceeded. If the requisite threshold value has not been exceeded, then the access request and/or the modify request received from the website may be denied by the fair tracking service in step 320. If the requisite threshold value has been exceeded, then the extent of the website's access and/or the extent of the website's allowed modifications may be determined in step 325.

In step 325, a set of rules selected by the user may determine the extent of the website's access to a user profile and/or the extent of the website's modifications to a user profile. In some embodiments, step 315 and step 325 may be combined into a single step. If the set of rules selected by the user is satisfied, then in step 335, the website's access may be granted or the website's modifications may be allowed. If the set of rules is not satisfied, then in step 330, the fair tracking service may deny the website's access or the website's modifications.

For example, regarding the extent of a website's access to a user profile, a set of user rules may specify that a website whose trust level value exceeds a threshold value of 95% may access an entire user profile; a website whose trust level value exceeds 90% but does not exceed 95% may access the entire user profile except for the user's address and the user's purchasing information; and a website whose trust level does not exceed 90% may only access a list of products that the user is searching for. Regarding the extent of a website's ability to modify a user profile, in some embodiments, a set of user rules may specify that websites may make additions to a list of products of interest to the user but may not make any other changes to the user profile.

The method 340 illustrated in FIG. 3B may use a set of rules that are preestablished by a user to determine a website's access to a user profile and to determine the website's ability to modify the user profile. In step 345, a fair tracking service may initiate an application of the set of rules. In step 350, the fair tracking service may determine whether the set of rules is satisfied. If the set of rules is satisfied, then the fair tracking service may grant the website's access request and/or the website's modify request in step 360. If the set of rules is not satisfied, then the fair tracking service may deny the website's access request and/or the website's modify request in step 355.

For example, in some embodiments, a user may establish a set of rules that grant all access requests received by the fair tracking service from certain websites specified by the user. In some embodiments, a user may establish a set of rules that require all modify requests to be presented to the user to be manually approved or denied.

The method 365 illustrated in FIG. 3C may provide the user manual control over a website's access to a user profile and a website's ability to modify the user profile. In step 370, the fair tracking service may present to the user an access request or a modify request received from a website. For example, in some embodiments, a processor of the fair tracking service may cause the access request and/or the modify request to be displayed to the user with alphanumeric characters via a GUI. In some embodiments, a processor of the fair tracking service may communicate the access request and/or the modify request to the user with audible sounds, such as a recording or a computer-generated recitation of the access request and/or the modify request.

In step 375, the user may input a response to the presented access request and/or modify request. For example, in some embodiments, the user may select an option to grant or an option to deny an access request presented to the user within a window of a GUI. In some embodiments, the user may input a response to the presented request by typing or dictating the response to a processor that is in communication with the fair tracking service. If the user chooses to deny a request, the fair tracking service may deny the request in step 380. If the user chooses to grant or approve a request, the fair tracking service may grant or approve the request in step 385.

Figure 4:
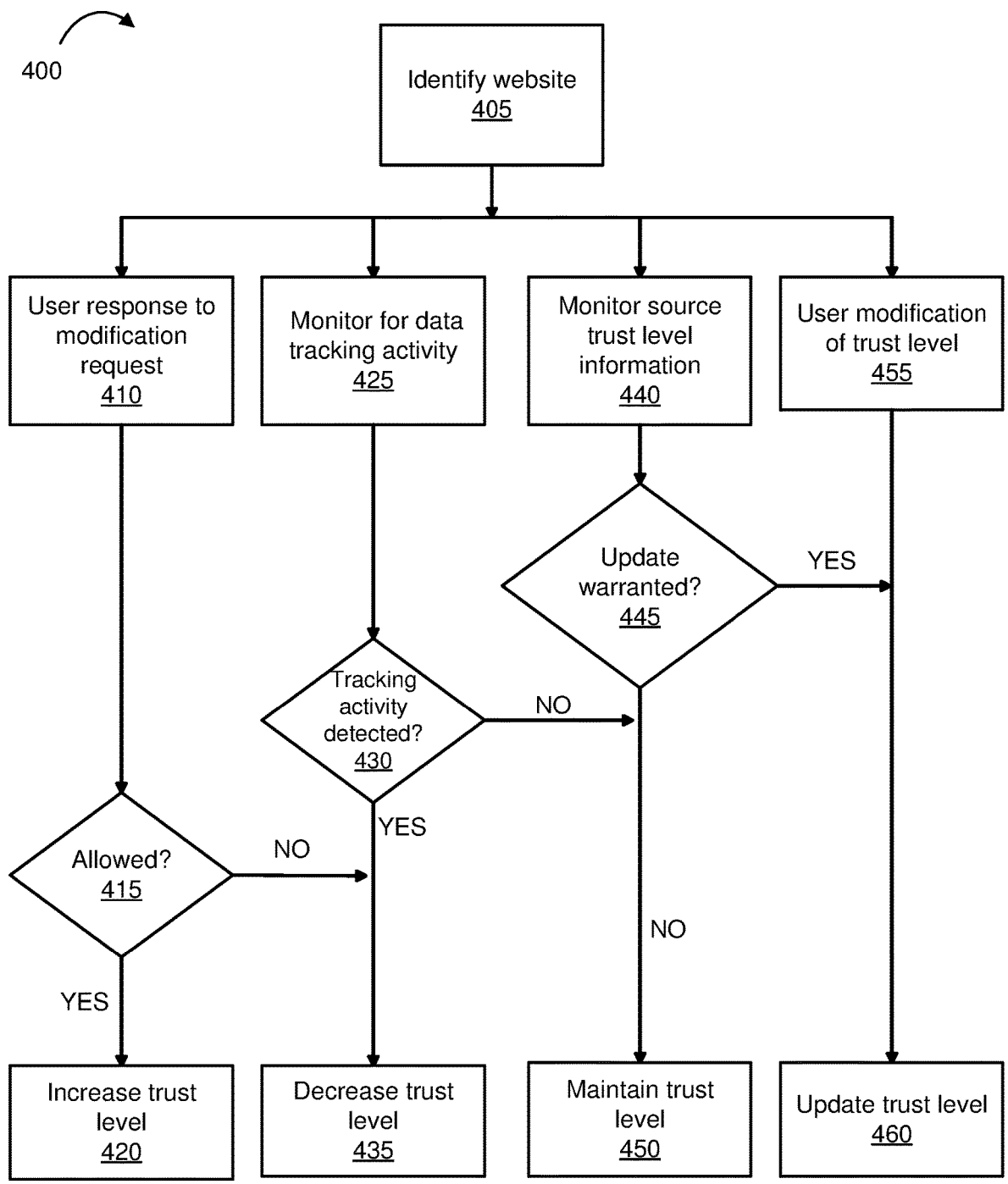
FIG. 4 depicts a flowchart of an example method for determining modification of a trust level, in accordance with embodiments of the present disclosure.

FIG. 4 illustrates an example set of methods 400 for modifying a trust level of a website, in accordance with embodiments of the present disclosure. In step 405, the fair tracking service identifies a website whose trust level may be modified.

The fair tracking service may determine a modification of a website's trust level based on a user's manual response to a modification request from the website. In step 410, the fair tracking service may obtain a user's manual response to the modification request. In some embodiments, the response may be obtained from user input to a fair tracking client. In step 415, the fair tracking service may determine whether the user manually approved the modification request. If the user manually approved the modification request, then the fair tracking service may increase the website's trust level in step 420. If the user manually denied the modification request, then the fair tracking service may decrease the website's trust level in step 435.

In some embodiments, by increasing the website's trust level based on the user's manual approval of a modification request, the fair tracking service may permit more access and more control over a user profile by a website that appears to be aligned with the user's interests. In contrast, by decreasing the website's trust level based on the user's manual denial of a modification request, the fair tracking service may permit less access and less control over a user profile by a website that appears to not be aligned with the user's interests.

For example, in some embodiments, a user may visit a website of a clothing store to search for business attire. The website may have an initial trust level value of 50%, which, based on a set of user rules, may permit the website to access only a portion of the user profile, such as the list of products the user is searching for (e.g., sweaters and dress shirts). In contrast, the set of user rules may permit a website having a trust level value that exceeds 80% to access a larger portion of the user profile, such as a portion that includes the user's clothing size preferences and city of residence. Additionally, the set of user rules may specify that the fair tracking service automatically approve modification requests from a website having a trust level value that exceeds 90%. As the user browses the products on the website, the website may recognize trends in the user's activity that indicate specific user preferences (e.g., the user spends more time browsing dark colored sweaters and patterned dress shirts than other clothing types). In response, and to facilitate the user's browsing experience, the website may present to the user one or more modify requests to add preferences for dark colored sweaters and patterned dress shirts to the user profile. In response to the user approving the modification requests, the fair tracking service may increase the website's trust level value by a predetermined amount, such as by 5%. Furthermore, by obtaining additional approved modification requests, the website may obtain a trust level value that exceeds 90%. The increased trust level value may indicate that the website is aligned with the user's interests, and therefore, the fair tracking service may be configured to grant the website more access to the user profile (e.g., the website may be permitted to access a larger portion of the user profile) and also grant the website more control to modify the user profile (e.g., the website's modification requests may be automatically approved). In contrast, a decreased trust level resulting from the user's denials of modification requests from the website may correspond with the fair tracking service limiting the website's ability to access and modify the user profile.

The fair tracking service may perform intermittent or continuous monitoring to determine a trust level for a website. For example, in step 425, the fair tracking service may monitor for potential data tracking activity of a website, and based on the monitoring, determine a trust level for the website. In some embodiments, in step 440 the fair tracking service may monitor a source of trust level information about a website to determine a website's trust level.

In some embodiments, step 425 may include the fair tracking service implementing anti-tracking technology to monitor a website's potential user-data tracking activity (e.g., the use of tools such as malware, spyware, and/or cookies to obtain personal user data, such as a name, age, location, user-purchasing information, etc.). In step 430 the fair tracking service may determine whether data tracking activity by the website has been detected. If such tracking activity has been detected, then the fair tracking service may decrease the website's trust level in step 435. If such tracking activity has not been detected, then the fair tracking service may maintain the website's trust level in step 450. In some embodiments, the fair tracking service may increase, rather than maintain, a website's trust level when it has not detected tracking activity of the website over a continuous period of time. For example, if the fair tracking service determines that a website has not tracked a user's data during the user's weekly website visits over the course of a year, the website may increase the website's trust level.

In some embodiments, in step 440, the fair tracking service may monitor a source such as a server where tracking information corresponding to a website's user-data tracking activity and/or user privacy practices may be stored. For example, a third-party company or organization may research and report on how a website compiles information about the website's users, the type of information the website compiles about the website's users, and/or how the website uses information it compiles about the website's users. Additionally, the reports of such research (i.e., tracking information) may be stored on a server and made available to the public via a website of the third-party company or organization. In some embodiments, step 440 may include the fair tracking service monitoring such tracking information, and step 445 may include determining whether to update the website's trust level based on the tracking information. If the fair tracking service determines that an update to the website's trust level is warranted based on the tracking information (e.g., presently acquired tracking information is different from previously acquired tracking information), then the website's trust level value is updated in step 460. Otherwise, if the fair tracking service determines that an update to the website's trust level is not warranted based on the tracking information (e.g., a presently assigned trust level is in accordance with presently acquired tracking information), then the website's trust level value is maintained in step 450.

For example, an organization may publish on its website a monthly review of the data tracking practices of multiple websites. The organization's monthly publication may include an A, B, or C-rating for each website's data tracking practices, where an A-rating indicates the organization's highest approval of a website's data tracking practices, a B-rating indicates the organization's lesser approval of a website's data tracking practices, and a C-rating indicates that the organization does not approve of the website's data tracking practices. In some embodiments, a fair tracking service may monitor the organization's publication on a monthly basis and correlate an A-rating with a 60% trust level value, a B-rating with a 50% trust level value, and a C-rating with a 0% trust level value.

During a first month, the fair tracking service may obtain from the organization's website an A-rating for a user-visited website. Accordingly, during the first month, the fair tracking service may assign the user-visited website a trust level value of 60%. During a second month, the fair tracking service may obtain from the organization's website another A-rating for the user-visited website. Accordingly, the fair tracking service may determine that an update to the user-visited website's trust level is not warranted because the user-visited website's rating did not change. Thus, the fair tracking service may maintain the assignment of a 60% trust level value to the user-visited website. During a third month, the fair tracking service may obtain from the organization's website a C-rating for the user-visited website. In this case, the fair tracking service may determine that an update to the user-visited website's trust level is warranted because the user-visited website's rating changed. Accordingly, the fair tracking service may update the user-visited website's trust level value to a 0% trust level value.

In some embodiments, a user may manually command a fair tracking service to update the trust level of a website in step 455, and in response, the fair tracking service may update the trust level in step 460. For example, a user may learn from a friend that the friend always uses a particular Internet search engine because of that search engine's outstanding privacy policies. The user may then manually command the fair tracking service to update the search engine's trust level value to a value of 80% from a value of 50%.

Figure 5:
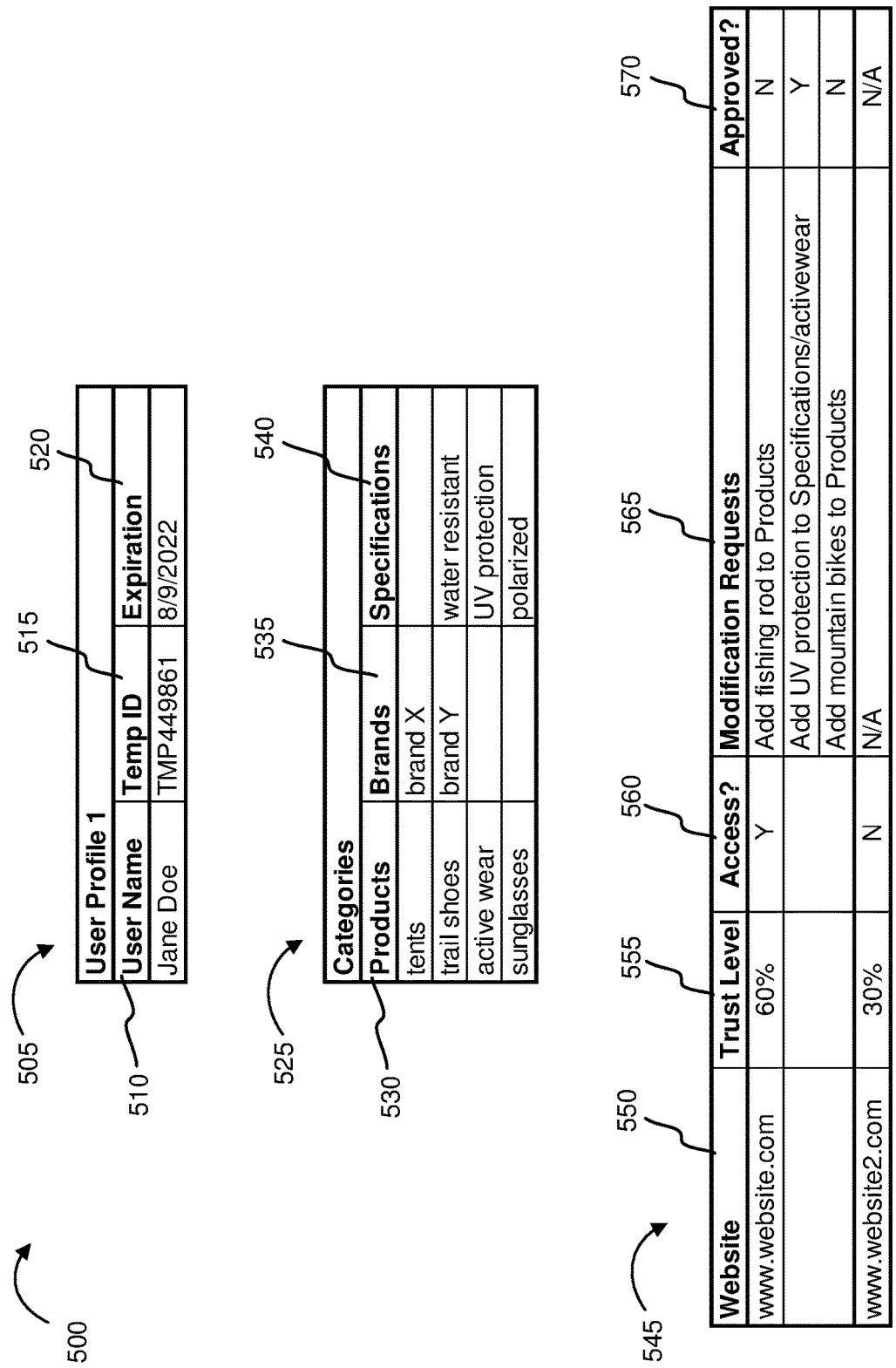
FIG. 5 depicts exemplary tables of a data file supporting a fair tracking service, in accordance with embodiments of the present disclosure.

FIG. 5 illustrates a set of profile data tables 500 that may support a fair tracking service in accordance with embodiments of the present disclosure. In some embodiments, tables 500 may be stored on a storage device that is accessible by a processor of the fair tracking service.

In some embodiments, table 505 may include a column for a user name 510, a temporary tracking ID 515, and an expiration time and/or date 520 for at least one entry of the profile data tables 500. For example, in some embodiments, the fair tracking service may assign an expiration time and/or date to at least one of the approved modification requests. The expiration time and/or date may be set manually by a user or it may be established by a user rule. The assignment of the expiration time and/or date may allow the user to maintain a set of core user profile data, while permitting temporary modifications to the core set of user profile data.

For example, a user's core user profile may include a list of ski equipment products and corresponding specifications. During a morning of a first day, the user may wish to search a website of a sporting goods store for a set of golf clubs. To facilitate the user's search for the set of golf clubs, the user may approve modification requests from the website to add categories of golf club brands and golf club specifications to the user profile. However, since the user does not intend to regularly search for golf clubs, the user may wish to select an expiration time and date, such as 11:30 AM on the first day, for the approved modification requests. By selecting the expiration time and date, the user may benefit from a website tailored for a golf club search for a limited time, such as during the morning, but after the expiration time and date, the user may return to a core user profile that may facilitate a search for ski equipment during an afternoon of the first day.

In some embodiments, table 525 may include a set of categories of user interests and preferences. For example, table 525 may include a column of user-selected products of interest 530, a column of user-selected brands 535, and a column of user-preferred product specifications 540. A website having access to a user profile may refer to table 525 to tailor the presentation of the website according to the user's interests.

For example, in some embodiments, a website may automatically apply filters to reduce the number of products displayed on the website according to the user's specifications. For example, if the user is browsing trail shoes on the website, the website may apply filters based on table 525 such that only trail shoes of brand Y that are also water resistant are displayed. In some embodiments, the website may tailor its presentation of discounts and/or advertisements based on table 525.

In some embodiments, table 545 may include information about the activity of the fair tracking service. Such information may include columns of websites visited by the user 550, corresponding trust levels assigned to each website 555, the status of the website's ability to access the user profile 560, the modification requests submitted to the fair tracking service by each website 565, and the result of whether each modification request was approved 570.

Figure 6:
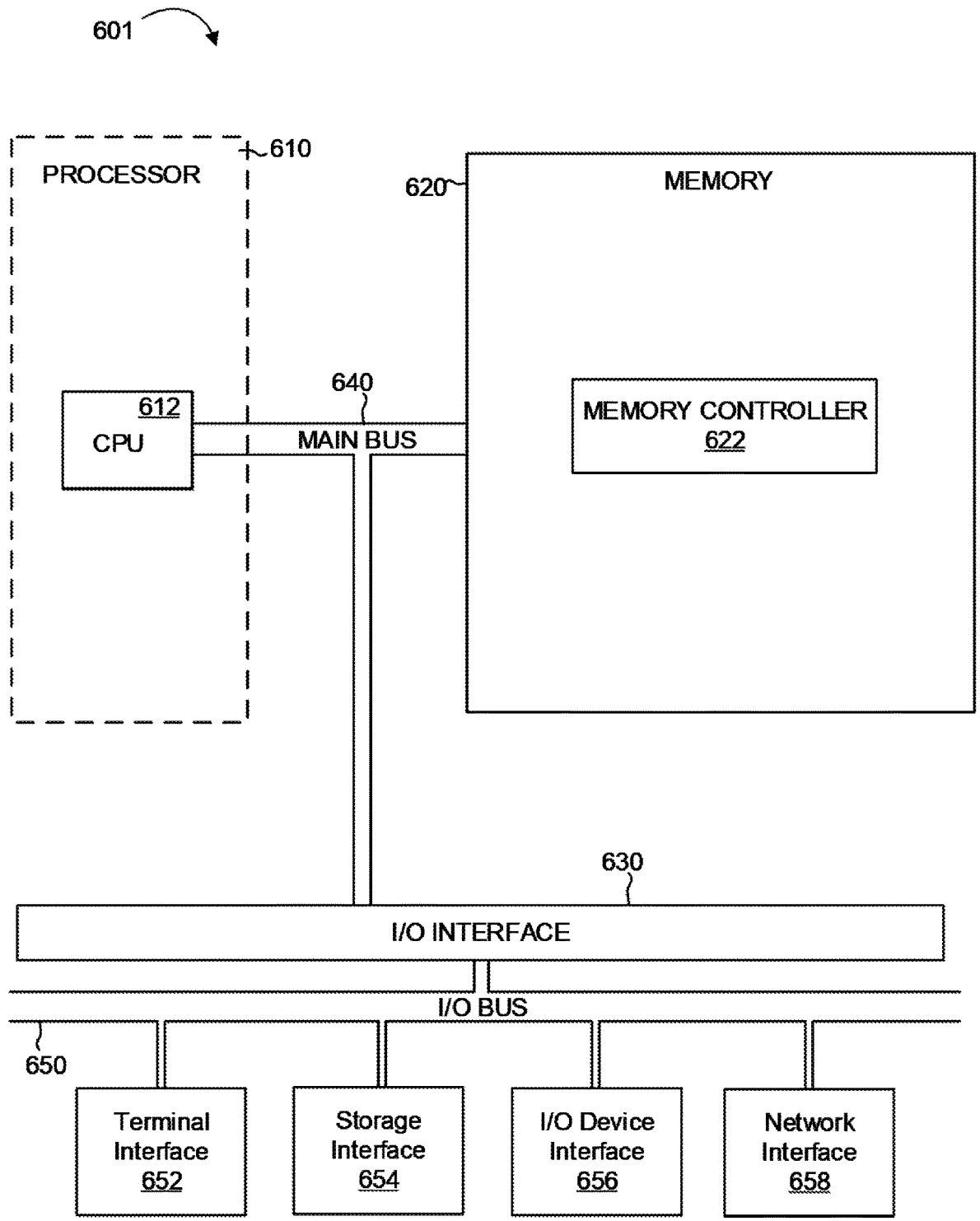
FIG. 6 depicts the representative major components of a computer system that may be used in accordance with embodiments of the present disclosure.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
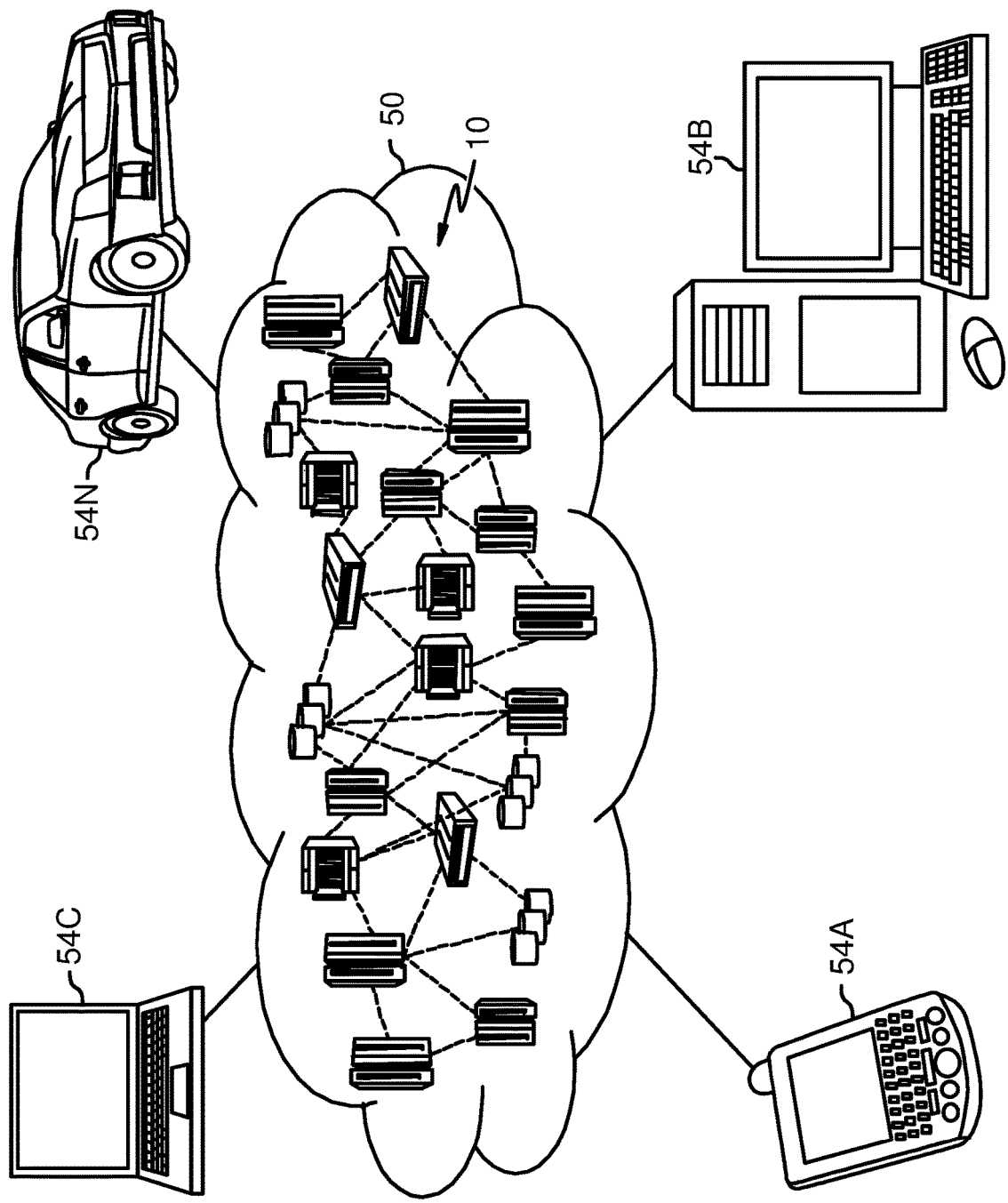
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
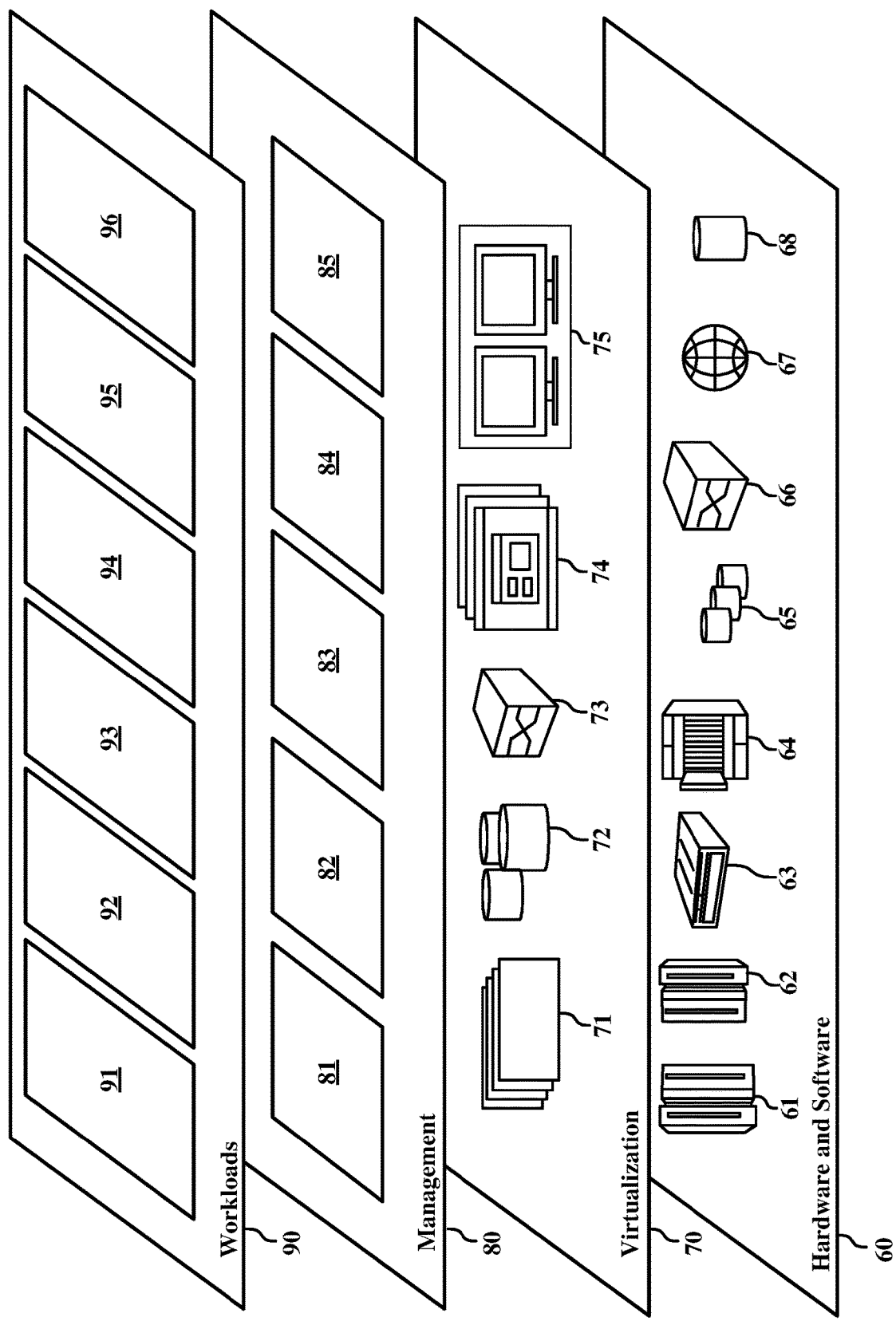
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fair tracking logic 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving, from a fair tracking client, a user profile including personal user data, the fair tracking client receiving the personal user data from a user;
    receiving, from a service-provider website visited by the user, an access request to access the user profile;
    determining to grant the access request;
    permitting the service-provider website to access the user profile in response to the determination to grant the access request;
    receiving a modify request from the service-provider website to add suggested user profile data to the user profile, the suggested user profile data based on activity by the user on the service-provider website;
    determining, in response to the modify request, to modify the user profile to include the suggested user profile data; and
    modifying the user profile in response to the determination to modify the user profile.

2. The method of claim 1, further comprising obtaining tracking information indicating whether the service-provider website uses one or more tools, in a manner that circumvents the user profile, to obtain personal user data of the user.

3. The method of claim 2, further comprising determining, based on the tracking information, a trust level for the service-provider website.

4. The method of claim 3, wherein the determination to modify the user profile is based on the trust level exceeding a threshold.

5. The method of claim 3, wherein the determination to grant the access request is based on the trust level exceeding a threshold.

6. The method of claim 1, further comprising: generating a temporary tracking identification code; and
    sharing the temporary tracking identification code with the service-provider website.

7. The method of claim 1, wherein the modify request is presented to the user and the determination to modify the user profile is based on the user approving the modify request.

8. The method of claim 7, further comprising determining a trust level for the service-provider website, wherein the trust level is increased in response to the user approving the modify request.

9. The method of claim 1, wherein the personal user data is selected from the group consisting of a phone number, an address, and credit card information.

10. A system comprising:
    a processor; and
    a memory in communication with the processor, the memory containing program instructions that, when executed by the processor, are configured to cause the processor to perform a method, the method comprising:
    receiving, from a fair tracking client, a user profile including personal user data, the fair tracking client receiving the personal user data from a user;
    receiving, from a service-provider website visited by the user, an access request to access the user profile;
    determining to grant the access request;
    permitting the service-provider website to access the user profile in response to the determination to grant the access request;
    receiving a modify request from the service-provider website to add suggested user profile data to the user profile, the suggested user profile data based on activity by the user on the service-provider website;
    determining, in response to the modify request, to modify the user profile to include the suggested user profile data; and
    modifying the user profile in response to the determination to modify the user profile.

11. The system of claim 10, the method further comprising obtaining tracking information indicating whether the service-provider website uses one or more tools to obtain personal user data of the user that the service-provider website cannot obtain from the user profile.

12. The system of claim 11, the method further comprising determining, based on the tracking information, a trust level for the service-provider website.

13. The system of claim 12, wherein the determination to modify the user profile is based on the trust level exceeding a threshold.

14. The system of claim 12, wherein the determination to grant the access request is based on the trust level exceeding a threshold.

15. The system of claim 10, wherein the modify request is presented to the user, and the determination to modify the user profile is based on the user approving the modify request.

16. The system of claim 15, the method further comprising determining a trust level for the service-provider website, and wherein the trust level is increased in response to the user approving the modify request.

17. A computer program product, the computer program product comprising a computer readable storage medium having program instructions embodied therewith, the program instructions executable by a computer to cause the computer to:

receive, from a fair tracking client, a user profile including personal user data, the fair tracking client receiving the personal user data from a user;

receive, from a service-provider website visited by the user, an access request to access the user profile;

make a determination to grant the access request;

permit the service-provider website to access the user profile in response to the determination to grant the access request;

receive a modify request from the service-provider website to add suggested user profile data to the user profile, the suggested user profile data based on activity by the user on the service-provider website;

make a determination, in response to the modify request, to modify the user profile to include the suggested user profile data; and modify the user profile in response to the determination to modify the user profile.

18. The computer program product of claim 17, further comprising instructions to obtain tracking information indicating whether the service-provider website uses one or more tools, in a manner that circumvents the user profile, to obtain personal user data of the user.

19. The computer program product of claim 18, further comprising instructions to determine, based on the tracking information, a trust level for the service-provider website.

20. The computer program product of claim 19, wherein the determination to modify the user profile is based on the trust level exceeding a threshold.

* * * * *